United States Patent [19]

Goolsby

[11] 4,153,043
[45] May 8, 1979

[54] APPARATUS FOR SOLAR HOT WATER SYSTEM AND METHOD OF MAKING SAME

[75] Inventor: Patrick F. Goolsby, Richmond, Va.

[73] Assignee: Reynolds Metals Company, Richmond, Va.

[21] Appl. No.: 846,777

[22] Filed: Oct. 31, 1977

[51] Int. Cl.² .............................................. F24J 3/02
[52] U.S. Cl. .................................. 126/271; 237/1 A; 165/115; 165/135
[58] Field of Search .................. 126/270, 271, 400; 237/1 A; 165/115, 135, 18

[56] References Cited

U.S. PATENT DOCUMENTS

| | | | |
|---|---|---|---|
| 1,250,260 | 12/1917 | Wilcox | 126/271 |
| 3,254,703 | 6/1966 | Thomason | 126/271 |
| 3,991,936 | 11/1976 | Switzgable | 237/1 A |
| 4,037,579 | 7/1977 | Chubb | 126/400 |

Primary Examiner—Kenneth W. Sprague
Assistant Examiner—James C. Yeung
Attorney, Agent, or Firm—Glenn, Lyne, Girard, Clark and McDonald

[57] ABSTRACT

Apparatus for heating and maintaining the temperature of water in a hot water tank of a solar hot water system and method of making same are provided wherein such apparatus comprises a thermally insulating container disposed around and in spaced relation from the tank with the container having a bottom portion defining a sump for a heat transfer liquid employed in the system and a device for maintaining the level of such liquid in the sump beneath the tank during normal system operation to thereby assure maintenance of an air space substantially completely around the tank with the air space cooperating with the insulating container to assure the temperature of water in the tank is maintained with minimum loss; and, the apparatus may also employ a pressure sensitive shut-off device in the cold water supply to the tank which cooperates with the air space to assure operation of the system with substantially no likelihood of contamination of the cold water supply.

21 Claims, 2 Drawing Figures

APPARATUS FOR SOLAR HOT WATER SYSTEM AND METHOD OF MAKING SAME

BACKGROUND OF THE INVENTION

Numerous proposals have been made heretofore to provide a solar hot water system; however, inherent in such a system is the problem of providing efficient heating of the water in a hot water tank of the system and maintaining the water heated with minimum heat loss. Another problem encountered with a solar hot water system is the necessity of assuring that, in the event of failure of system components, a heat transfer liquid normally employed in the energy transport subsystem of the overall system does not contaminate the cold water supply.

SUMMARY

This invention provides an improved apparatus and method of making same which basically overcomes the abovementioned problems; and, such apparatus provides efficient heating and the maintaining of temperature of water in a hot water tank of a solar hot water system comprising a thermally insulating container disposed around and in spaced relation from the tank with the container having a bottom portion defining a sump for the heat transfer liquid and a device for maintaining the level of the liquid in the sump beneath the tank during normal operation to thereby assure maintenance of an air space substantially completely around the tank with the air space cooperating with the insulating container to assure the temperature of water in the tank is maintained with minimum loss.

The apparatus may employ a pressure sensitive shut-off device in the cold water supply to the tank which cooperates with the air space to assure operation of the system with substantially no likelihood of contamination of the cold water supply.

Other details and advantages of the invention will become apparent as the following description of the embodiment thereof in the accompanying drawings proceeds.

BRIEF DESCRIPTION OF THE DRAWINGS

The accompanying drawings show a present preferred embodiment of the invention, in which.

DESCRIPTION OF ILLUSTRATED EMBODIMENT

Figure 1:
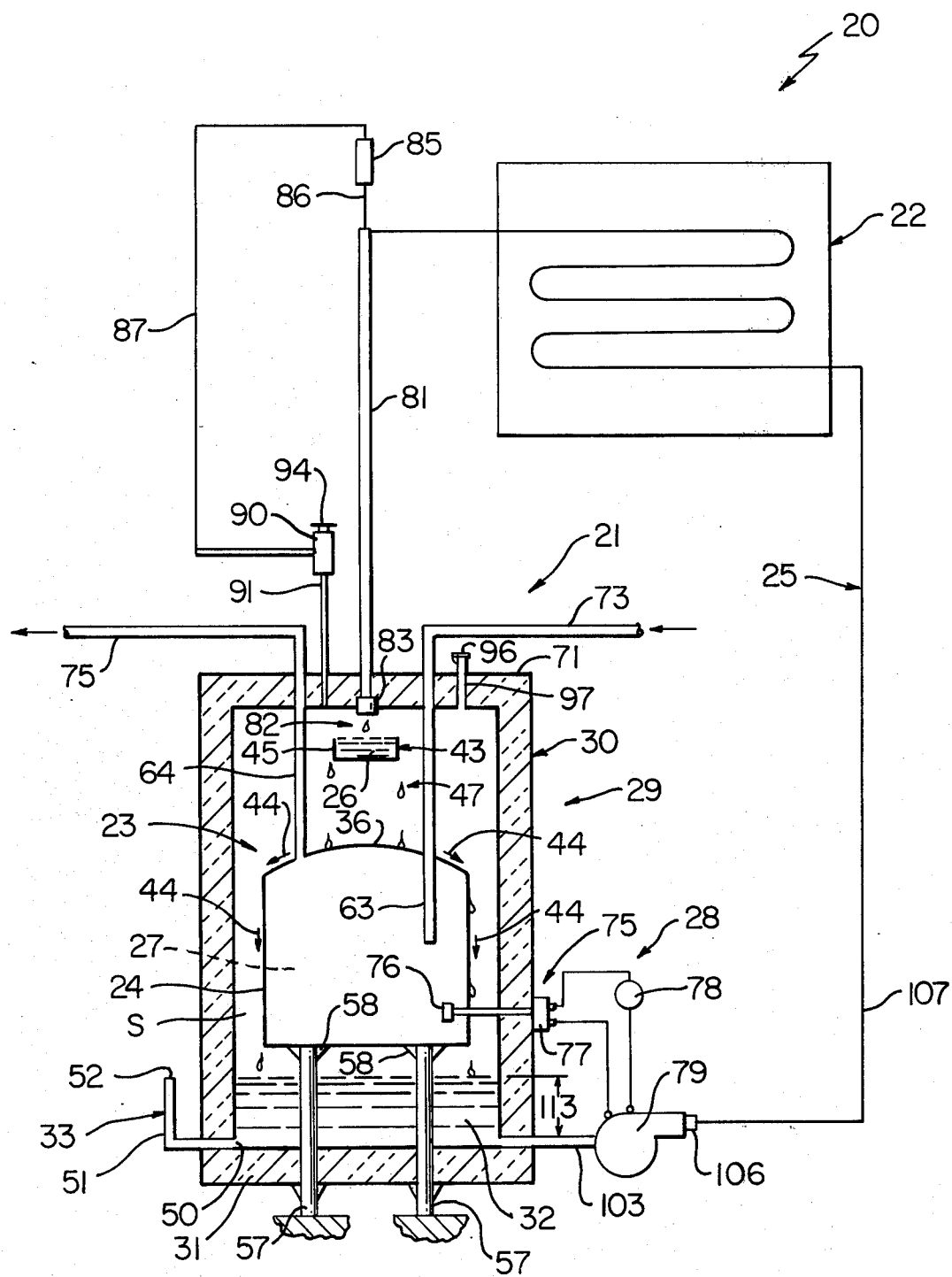
FIG. 1 is a schematic presentation of a solar hot water system employing one exemplary embodiment of the apparatus and method of the invention.

Reference is now made to FIG. 1 of the drawings which illustrates a solar hot water system which is designated generally by the reference numeral 20 and such hot water system employs one exemplary embodiment of a fail-safe apparatus of this invention and method of making such apparatus designated generally by the reference numeral 21 and as will be described in more detail subsequently. The system 20 has a collector subsystem 22, a hot water storage subsystem 23 including a hot water tank 24, an energy transport subsystem 25 operatively connected between the collector subsystem 22 and the hot water storage subsystem 23 and including a heat transfer liquid 26. The system 20 also includes the apparatus 21 for heating and maintaining the temperature of water 27 in the tank 24 and a control subsystem 28 for the collector subsystem 22, the hot water storage subsystem 23, the energy transport subsystem 25, and the apparatus 21.

The various subsystems 22, 23, 25, 28, and apparatus 21 have each been designated generally by arrows and each at only a typical location. Further, in accordance with standard practice in the art, the control subsystem 28 comprises all of the devices and their electrical, pneumatic, or hydraulic auxiliaries used to regulate the processes of collecting, transporting, storing, and utilizing energy in response to the thermal, safety, and health requirements of the building occupants or facility employing the system 20.

The apparatus 21 which may comprise an assembly which will be referred to as a tank assembly and designated generally by the reference numeral 29 comprises a thermally insulating container 30 disposed around and in spaced relation from the tank 24 and it will be seen that the container 30 has a bottom portion 31 defining a sump 32 for heat transfer liquid 26. The apparatus 21 also has a device 33 for maintaining the level of the liquid in the sump beneath the tank 24 during normal operation of the system 20 to thereby assure maintenance of an air space substantially completely around the tank 24 even with heat transfer liquid 26 in the sump 32 and such air space is indicated generally by the reference letter S. The air space cooperates with the insulating container 30 to assure that temperature of water 27 in the tank 24 is maintained with minimum loss.

Figure 2:
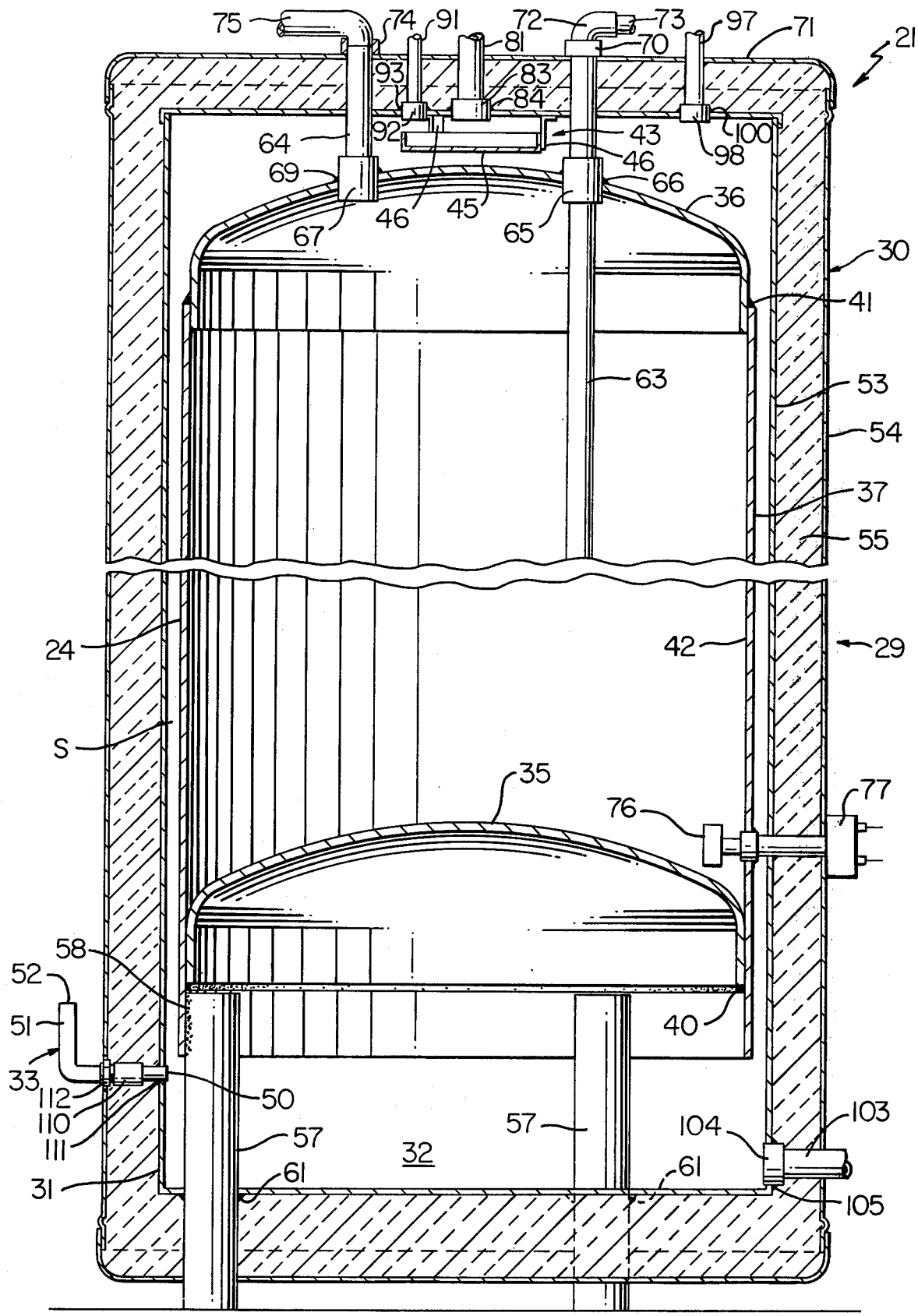
FIG. 2 is a view with parts in cross-section, parts in elevation, and parts broken away particularly illustrating structural details of the apparatus of the invention and method of making same.

The tank 24 illustrated in FIG. 2 has an inwardly convex bottom wall 35, an outwardly convex top wall 36, and a side wall which in this example is in the form of a substantially right circular cylindrical side wall 37 connected between the bottom wall 35 and top wall 36. The bottom wall 35 is fixed to the side wall 37 by any suitable means such as an annular weld 40 and similarly the top wall 36 is fixed to the top edge of the side wall 37 by means such as an annular weld 41 to thereby provide a high strength water tight vessel. As is customary for hot water tanks, the tank 24 has its inside surface lined with a suitable anticorrosion material such as glass or the like and the glass lining is not depicted by cross hatching in the drawings but by the single line 42 defining the inside surfaces of the walls 35, 36, and 37.

The apparatus 21 as shown in FIG. 1, also comprises means 43 for introducing the heat transfer liquid 26 against the top wall 36 of the tank 24 enabling gravity flow of such liquid 26 as a film indicated by arrows 44 along the outside surfaces of the top wall 36 and side wall 37 to thereby provide optimum heat transfer between the liquid 26 and such walls and thus optimum heating of the water 27 within the tank 24. The introducing means 43 as depicted in FIG. 2, comprises a pan 45 which is supported by a pair of brackets 46 having their opposite ends suitably fixed to the container 30 and to pan 45 whereby the pan is supported in spaced relation above the tank 24 such that upon filling of the pan 45 the heat transfer liquid 26 overflows the pan onto the outwardly convex top wall 36 and such overflowing is represented schematically at 47 in FIG. 1 by drops of liquid 26 between the pan 45 and top wall 36.

The apparatus 21 has a device 33 for maintaining the level of the liquid 26 in the sump 32 beneath the tank 24 to thereby assure maintenance of the air space S completely around the tank 24 as previously mentioned and for the purpose previously specified. The device 33 comprises a liquid discharge port 50 in the container 30 beneath the bottom wall 35 of the tank 24 and the device 33 of the example comprises a transparent sight tube 51 made of plastic or glass and tube 51 is in flow communication with the port 50. The sight tube 51 has an upper open end 52 which is disposed beneath the bottom weld 40 so that in the event of an excessive volume of heat transfer liquid 26 in the sump 32 such liquid will flow out of the open end 52 and assure the maintenance of the space S completely around the tank 24.

The thermally insulating container 30 of the apparatus 21 in FIG. 2 comprises an inner fluid tight housing or receptacle 53 which is disposed in spaced relation about the entire outer periphery of such tank and an outer shroud 54 which is disposed in spaced relation about the entire outer periphery of the inner receptacle 53. The container 30 has a thermally insulating material 55 disposed between its receptacle 53 and shroud 54 and the insulating material is selected such that it provides optimum insulation for the hot water 27 in the tank 24. The insulation 55 cooperates with the air space S (which is essentially a dead air space) to provide, in essence, a double insulation for the tank 24.

The tank assembly 29 has support means which serves as support means for the apparatus 21 and tank 24, and such support means comprises a plurality of support columns or legs each designated by the same reference numeral 57. Each support leg 57 has its upper end portion suitably fixed, by welding or the like, as shown in FIG. 1 at 58, to a lower portion 60 of the cylindrical side wall 37 which extends beneath the bottom wall 35.

Each support leg 57 shown in FIG. 2 extends in sealed relation through the inner receptacle 53 and then through the insulating material 55 and shroud 54. A fluidtight seal is provided where each leg 57 extends through the receptacle and such seal is provided by sealing means such as a circumferential weld 61. The welds 61 serve as a means of fastening the container 30 to the support legs 57 whereby the entire weight of the tank assembly 29 is supported by the support legs 57. Although any desired number of legs 57 may be used, a plurality of three legs are used for the tank assembly 29 of the example shown in FIG. 2.

The tank 24 as seen in FIG. 2, the tank 24 has a cold water supply pipe section 63 and a hot water discharge pipe section 64 in fluid flow communication therewith. The pipe section 63 extends in a fluid tight manner through a pipe sleeve 65 fixed by an annular weld 66 to the top wall 36 of the tank 24, and section 63 extends a substantial distance within the tank 24. Similarly, the hot water discharge pipe section 64 is connected in a fluid tight manner to a pipe sleeve 67 which is fixed by an annular weld 69 to the top wall 36 of the tank 24.

The cold water supply pipe section 63 has a controlled pressure device in the form of a low pressure shut-off valve 70 suitably fixed to a portion thereof which extends outwardly of a top wall 71 of the shroud 30. The valve 70 has a suitable connector fitting 72 which is employed to connect the valve 70 with a supply pipe 73 from a water source which is to be heated. Similarly, the hot water discharge pipe section 64 has a pipe sleeve 74 fixed to a portion thereof which extends outwardly of the top wall 71. The sleeve 74 has an outer portion which is suitably connected to a hot water discharge pipe 75 which supplies hot water from the tank 24 for use as desired.

The shut-off valve 70 is of any suitable type known in the art and comprises a part of the control subsystem 28; and, the shut-off valve 70 is set so that it shuts off the flow of cold water into the tank 24 in the event of a sufficient drop in low pressure (to 10 psig, for example) in the vicinity of the valve 70.

Thus, it will be appreciated that in the event of a small pin hole or leak up stream of valve 70, when during normal operating conditions the pressure in the cold water supply pipes, tank 24, and hot water discharge pipes is greater than the pressure outside such pipes and outside of the tank 24, due to the provision of the air space S completely around the tank 24, there can be no back flow of heat transfer liquid 26 into the hot water 27. However, in the event of a substantial failure, such as a large opening in the tank 24, for example, or a large leak in either the hot water discharge pipe system or the cold water supply pipe system, there would be a substantial pressure drop downstream of the valve 70. This substantial drop would be sensed by the pressure shut-off valve 70 as a pressure differential causing automatic shut-off thereof whereby heat transfer liquid 26 could not back-up or reverse flow into the hot water 27, and contaminate same and then be discharged through pipe 75.

Thus, it will be appreciated that with the apparatus 21 of this invention the air space S and automatic shut-off valve 70 cooperate during normal operation of the system 20 such that there is substantially no likelihood and indeed it is practically impossible for any contamination of the hot water 27 by reverse flow of heat transfer liquid 26 to be discharged through pipe 75, or to be pulled into the cold water water line due to fluid line pressure drops.

While the controlled pressure device in the described example is a shut-off valve 70, such device may be of course embodied by still other forms, such as a pressure switch which would operate to shut down energy transport subsystem 25, when the pressure in the cold water supply pipe 63 drops below a predetermined level.

The tank assembly 29 may be sold as a self-contained assembly for quick installation in an overall solar hot water system which has a collector subsystem 22, energy transport subsystem 25, and control subsystem 28 of any desired type. To enable easier installation in an existing system 20 the pipe sections 63 and 64 are illustrated as extending through the container 30. It will also be appreciated that other connections are provided, as necessary, from the other subsystems of the overall system 20 to the tank assembly 29; and, although such connections may be made in a similar manner as shown in FIG. 2 for pipe sections 63 and 64 so that all connections may be made outside of the shroud portion 54 of container 30, in this disclosure not all connections are shown made in this manner and as will now be described.

The control subsystem 28 has hot water temperature control means 75 for the water 27 in tank 24. The control means 75 includes a temperature sensitive device, such as a thermocouple or a termister, such as thermocouple 76 disposed within the tank 24 having suitable connections extending through side wall 37 in a fluidtight manner to a differential temperature controller 77. The controller 77 is also connected to another temperature sensitive device, such as thermocouple 80, operatively connected to the collector subsystem 22. In operation, the controller 77 compares the temperature of the water 27 with that of the collector subsystem 22, and if the temperature of the collector subsystem 22 is higher than that of the water 27 by some predetermined amount, such as by 10° or 15° F., the controller activates a pump 79 of energy transport subsystem 25 to start circulation of the heat transfer liquid 26 through the collector subsystem 22 and through a conduit 81 which discharges into the pan 45 as illustrated at 82. In the example illustrated in FIG. 2, the terminal discharge end of the conduit 81 is fixed in a fluid-tight manner to a sleeve 83 which is welded and thus sealed in a fluid flow communication with receptacle 53 by an annular weld 84. Once activated, pump 79 will continue to operate until the temperature difference between the collector subsystem 22 and the water 27 drops to a second predetermined level, such as about 2° or 3° F., at which point the controller 77 will operate to shut the pump 79 off. The controller 77 may also house an adjustable control dial 78 (schematically illustrated in FIG. 1) for setting the difference in temperature between the collector subsystem 22 and the water 27 that will activate and deactivate the energy transport subsystem 25 as described.

The conduit 81 in FIG. 1 has air vent arrangement 85, such as a float valve, operatively connected to the upper end portion thereof by a conduit section 86 and an air line 87 extends between the vent 85 and an assembly 90, in this case a T-fitting, which has a conduit section 91 connected as shown in FIG. 2 in a fluid-tight manner to a sleeve 92 which is fitted to tank 24 by an annular weld 93 or other acceptable means. The assembly 90 in FIG. 1 has a plug 94 or other acceptable means which enables the heat transfer liquid 26 to be introduced into the sump 32 by gravity flow through conduit section 91. The components 85 and 90 comprise the control subsystem 28 and, in the example, vent 85 serves to vent the air space S so that it is maintained at ambient pressure.

The container 30 in FIG. 1 may have a pressure relief valve 96 which is part of the control subsystem 28. The valve 96 is connected to a conduit section 97 which as shown in FIG. 2 is sealed to a sleeve 98 which is in turn sealed by an annular weld 100 to the inner receptacle 53. The pressure relief valve 96 provides for relief of pressure within receptacle 53 in the event there is an excessive buildup of pressure for any reason. It will be appreciated, however, that any necessary pressure relief would in all likelihood be afforded by the open-end glass 51, described below. Thus valve 96 would except in the most extra ordinary of circumstances be unnecessary.

The pump 79 of the energy transport subsystem 25 may be of any suitable type known in the art and such pump is operatively connected to sump 32 by a pipe section 103 which is connected as shown in FIG. 2 to a tubular sleeve 104 which is sealed by an annular weld 105 to the inner receptacle 53. The pump 79 may be provided as an integral part of the tank assembly 29 and has a suitable fitting 106 (FIG. 1) provided thereon for connection to a conduit 107 comprising the energy transport system.

It will also be appreciated that sight glass 51 may be supplied as an integral part of the tank assembly 29 and such sight glass may be connected to the port 50 by a suitable connector assembly 110 shown in FIG. 2 extending between the port 50 and the sight glass 51. The assembly 110 has an inner portion sealed in flow communication with the receptacle 53 by an annular weld 111 and an outer portion detachably fixed to the shroud 54 of the container 30. The outer portion may have a suitable fitting 112 for receiving an inner end portion of sight glass 51 in sealed and fluid flow relation therewith.

The heat transfer liquid 26 may be any suitable heat transfer liquid known in the art for a solar hot water system. Similarly, a suitable inhibitor may be provided in the heat transfer liquid to prevent corrosion of the components that such liquid comes into contact with. For example, in applications where the liquid 26 is used with aluminum or steel components, it will be appreciated that a suitable inhibitor may be provided in the heat transfer liquid 26 to prevent corrosion of such aluminum or steel components.

This invention provides an improved apparatus, and method of making same, for heating and maintaining temperature of water in a hot water tank of a solar hot water system and the water being heated may be tap water that is used in the ordinary home for the usual purposes of drinking, cooking, bathing, and the like. Similarly, it will be appreciated that this invention may be employed to heat a liquid used strictly in a solar space heating system, or to heat swimming pool water, and the like. The volume of heat transfer liquid 26 in the sump 32 is controlled by the device 33 in the form of open-end sight glass 51. The volume of heat transfer liquid 26 in such sump is sufficient to provide all the heat transfer liquid that is necessary for the collector subsystem 22 as well as provide a sufficient pressure head, indicated in FIG. 1 at 113, to assure proper operation of the pump 80.

This invention takes advantage of the fact that the heat transfer liquid 26 flows over the tank 24 in what may be considered a turbulent film which provides a scrubbing action along the walls of the tank 24 and thus provides optimum heat transfer to the walls of the tank and in turn creates sufficient convective movement of the water 27 to provide an optimum heat transfer to the water 27 within the tank 24.

While present embodiments of this invention, and methods of practicing the same, have been illustrated and described, it will be recognized that this invention may be otherwise variously embodied and practiced within the scope of the following claims.

What is claimed is:

1. In a solar hot water system having a collector subsystem; a hot water storage subsystem having a hot water tank; an energy transport subsystem operatively connected between said collector and hot water storage subsystem and including a heat transfer liquid; apparatus for heating and maintaining the temperature of water in said tank; and a control subsystem for said subsystems and apparatus; the improvement wherein said apparatus for heating and maintaining the temperature of water in said tank comprises, a thermally insulating container disposed around and in spaced relation from said tank, said container having a bottom portion defining a sump within said container for said heat transfer liquid, and a device for maintaining the level of said liquid in said sump beneath said tank during normal operation to thereby assure maintenance of an air space substantially completely around said tank, said air space cooperating with said insulating container to assure the temperature of water in said tank is maintained with minimum loss.

2. A solar hot water system as set forth in claim 1 in which said tank has a bottom wall, a top wall, and a side wall connected between said bottom and top walls and wherein said apparatus further comprises means introducing said liquid against said top wall enabling gravity flow thereof as a film along said top wall and side wall to thereby provide optimum heat transfer between said liquid and said walls and thus optimum heating of said water.

3. A solar hot water system as set forth in claim 2 wherein said introducing means comprises a pan supported above said tank for receiving said liquid therein, said pan being disposed so that upon filling thereof liquid overflows therefrom onto said top wall.

4. A solar hot water system as set forth in claim 2 wherein said device comprises a liquid discharge port in said container beneath said bottom wall of said tank.

5. A solar hot water system as set forth in claim 4 wherein said device includes an open sight tube in flow communication with said liquid discharge port.

6. A solar hot water system as set forth in claim 2 wherein said thermally insulating container comprises an inner fluid-tight receptacle disposed in spaced relation from said tank, an outer shroud disposed in spaced relation from said receptacle, and a thermally insulating material disposed between said receptacle and shroud.

7. A solar hot water system as set forth in claim 6 and comprising the further improvement of support means for said tank, said apparatus, and said container, said support means extending in sealed fluid-tight relation through said receptacle and extending through aligned openings in said insulating material and shroud.

8. A solar hot water system as set forth in claim 7 wherein said support means comprises a plurality of support legs.

9. A solar hot water system as set forth in claim 6 having a cold water supply pipe and a hot water discharge pipe for said hot water tank each extending through said container and each in flow communication with said tank and comprising the further improvement wherein said control subsystem comprises controlled pressure device in said cold water supply pipe which automatically operates once a predetermined low pressure in said cold water supply pipe is reached to assure operation of said system without likelihood of contamination of water in said tank by said heat transfer liquid being passed through said hot water discharge pipe.

10. A solar hot water system as set forth in claim 2 and comprising the further improvement of an air vent for said air space.

11. A thermally insulated hot water tank assembly adapted to be heated by a heat transfer liquid of a solar hot water system comprising, a centrally disposed hot water tank, a thermally insulating container disposed around and in spaced relation from said tank, said container having a bottom portion defining a sump within said container for said heat transfer liquid, and a device for maintaining the level of said liquid in said sump beneath said tank during normal operation to thereby assure maintenance of an air space substantially completely around said tank, said air space cooperating with said insulating container to assure the temperature of water in said tank is maintained with minimum loss.

12. A tank assembly as set forth in claim 11 in which said tank has a bottom wall, a top wall, and a side wall connected between said bottom and top wall, and wherein said assembly further comprises means for introducing said liquid against said top wall enabling gravity flow thereof as a film along said top wall and side wall to thereby provide optimum heat transfer between said liquid and said walls and thus optimum heating of water in said tank.

13. A tank assembly as set forth in claim 12 wherein said introducing means comprises a pan supported above said tank for receiving said liquid therein, said pan being disposed so that upon filling thereof, said liquid overflows therefrom onto said top wall.

14. A tank assembly as set forth in claim 11 wherein said device comprises a liquid discharge port in said container beneath said bottom wall of said tank.

15. A tank assembly as set forth in claim 12 wherein said thermally insulating container comprises an inner fluid-tight receptacle disposed in spaced relation from said tank, an outer shroud disposed in spaced relation from said receptacle, and a thermally insulating material disposed between said receptacle and shroud.

16. A tank assembly as set forth in claim 12 and further comprising a cold water supply pipe and a hot water discharge pipe for said tank each extending through said container and each in fluid flow communication with said tank, and a low pressure shut-off valve connected in said cold water supply pipe section which automatically shuts-off said cold water supply pipe section once a predetermined low pressure is reached, said air space and automatic shut-off of said shut-off valve at said predetermined low pressure assuring operation of said system without likelihood of contamination of water in said tank by said heat transfer liquid being passed through said hot water discharge pipe.

17. In a method of making a solar hot water system having a collector subsystem; a hot water storage subsystem having a hot water tank; an energy transport subsystem operatively interconnected between said collector and hot water storage subsystems and including a heat transfer liquid; apparatus for the heating of water in said tank; and a control subsystem for said subsystems and apparatus, the improvement in the making of said apparatus for heating and maintaining the temperature of water in said tank comprising the steps of, disposing a thermally insulating container around said tank and in spaced relation therefrom, providing said container with a bottom portion defining a sump within a said container for said heat transfer liquid, interconnecting a device with said sump to maintain the level of liquid in said sump beneath said tank during normal system operation and thereby assure maintenance of an air space substantially completely around said tank, said air space cooperating with said insulating container to assure that the temperature of said water in said tank is maintained with minimum loss.

18. In a method of making a solar hot water system as set forth in claim 17 in which said tank has a bottom wall, a top wall, and a side wall connected between said bottom and top walls the further improvement in the making of said apparatus comprising the step of introducing said liquid against said top wall enabling gravity flow thereof as a film along said top wall and side wall to thereby provide optimum heat transfer between said liquid and said walls and thus optimum heating of said water.

19. In a method of making a solar hot water system as set forth in claim 18 the further improvement wherein said introducing step comprises supporting a pan above said tank for receiving said liquid therein, said pan being supported so that upon filling thereof liquid overflows therefrom onto said top wall.

20. In a method of making a solar hot water system as set forth in claim 19 the further improvement wherein said interconnecting step comprises providing a liquid discharge port in said container beneath said bottom wall of said tank and installing an open sight tube in flow communication with said liquid discharge port.

21. In a method of making a solar hot water system as set forth in claim 19 the further improvement including the steps of providing a cold water supply pipe and a hot water discharge pipe for said tank each extending through the top portion of said container and each in fluid flow communication with said tank, and a controlled pressure device in said cold water supply pipe which automatically operates once a predetermined low pressure in said cold water supply pipe is reached, said air space and automatic shut-off of said shut-off valve at said predetermined low pressure to assure operation of said system without likelihood of contamination of water in said tank by said heat transfer liquid being passed through said hot water discharge pipe.

* * * * *